US007818023B2

(12) United States Patent
Li et al.

(10) Patent No.: US 7,818,023 B2
(45) Date of Patent: Oct. 19, 2010

(54) POWER ALLOCATION SCHEME

(75) Inventors: Junyi Li, Bedminster, NJ (US); Arnab Das, Summit, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 11/861,471

(22) Filed: Sep. 26, 2007

(65) Prior Publication Data

US 2009/0082054 A1  Mar. 26, 2009

Related U.S. Application Data

(60) Provisional application No. 60/863,306, filed on Oct. 27, 2006.

(51) Int. Cl.
  H04B 7/00 (2006.01)
  H04Q 7/20 (2006.01)
(52) U.S. Cl. ............... 455/522; 455/69; 455/452.2; 455/453
(58) Field of Classification Search ......... 455/522, 455/69, 452.2, 453, 524, 63.1, 446, 509, 455/452.1
  See application file for complete search history.

(56) References Cited

U.S. PATENT DOCUMENTS

2004/0071194 A1* 4/2004 Suwa et al. ............ 375/146

2009/0221297 A1* 9/2009 Wengerter et al. ......... 455/453

FOREIGN PATENT DOCUMENTS

EP  1530388   5/2005
WO  9637082   11/1996

OTHER PUBLICATIONS

Duk-Kyu Park et al., "A New Channel Assignment by Controlling the Transmitted Power Level Based on the Distance Between the Cell Site and the Mobile Unit," Vehicular Technology Conference, 1994 IEEE 44th Stockholm, Sweden, Jun. 8-10, 1994, pp. 863-867, IEEE, New York, NY, USA, XP010123197.
International Search Report, PCT/US07/082565, International Search Authority, European Patent Office, Apr. 10, 2008.
Written Opinion, PCT/US07/082565, International Search Authority, European Patent Office, Apr. 10, 2008.

* cited by examiner

Primary Examiner—John Lee
(74) Attorney, Agent, or Firm—Donald C. Kordich

(57) ABSTRACT

Systems and methodologies are described that facilitate and effectuate power allocation schemes that reuse power allocation patterns amongst different carriers for sectors in the same cell and uses different power allocation patterns between cells. The frequency reuse scheme generates power allocation patterns, selects one of the generated power allocation patterns for use among at least two carriers of at least two sectors in a cell, and employs a second disparate power allocation pattern for use between at two cells.

21 Claims, 11 Drawing Sheets

POWER ALLOCATION SCHEME

CROSS-REFERENCE TO RELATED APPLICATIONS

The present application claims the benefit of U.S. Provisional Application Serial No. 60/863,306, entitled "POWER ALLOCATION SCHEME" which was filed Oct. 27, 2006. The entirety of the aforementioned application is herein incorporated by reference.

BACKGROUND

I. Field

The following description relates generally to wireless communications, and more particularly to power allocation schemes that reuse power allocation patterns amongst different carriers for sectors in the same cell and uses different power allocation patterns between cells.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing, (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

When a single transmitter or base station transmits with multiple carriers or data streams the best strategy to allocate power across carriers or data streams is typically to spread power evenly. However, when a second transmitter or base station is introduced, the foregoing rubric no longer holds true. More particularly, where an interferer or base station is introduced that employs the same or similar power and carrier allocation patterns or characteristics, boundary users (e.g., mobile devices situated at the peripheral broadcasting range of the base stations at issue) can operate below 0 dB and thus experience significant diminution in quality of service.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Systems and methodologies are described that facilitate and effectuate power allocation schemes that allocate a set of different transmit powers (a power allocation pattern) for different carriers in the same sectors and use the same power allocation pattern for different sectors within the same cell. Further, for sectors in neighboring cells, different power allocation patterns are assigned to maximize the system throughput. Throughout the network, a limited number of power allocation patterns can be defined and reused throughout the network according to the geographical location of the cells.

In accordance with one aspect of the claimed subject a method of operating a first wireless communications device is provided wherein the device determines a first power allocation pattern on a plurality of different carriers, transmits signals in a first carrier of the plurality of carriers, where the total transmission power of the first carrier is set to be a first transmission power value as a function of the first power allocation pattern, and transmits signals in a second carrier of the plurality of carriers, where the total transmission power of the second carrier is set to be a second transmission power value as a function of the first power allocation pattern, the second transmission power value being different from the first transmission power value.

In accordance with a further aspect of the claimed subject matter an apparatus operable in a wireless communication system can be provided wherein the apparatus includes means for evaluating signal to noise ratios of transceived signals emanating from a portable means for transceiving; means for identifying an appropriate sector in an appropriate carrier with the total transmission power set to be a power level, determined by the power allocation scheme, based at least on the signal to noise ratios; and means for allocating signals emanating from the portable means for transceiving to a power level such that the total transmit power within the sector in the associated carrier is less than or equal to the associated power level in the power allocation pattern.

Additionally, the claimed subject matter in accordance with a further aspect can include an electronic device configured to execute a method comprising ascertaining a first power allocation pattern on a plurality of different carriers; transmitting signals in a first carrier of the plurality of carriers, where the total transmission power of the first carrier is set to be a first transmission power value as a function of the first power allocation pattern; and broadcasting signals in a second carrier of the plurality of carriers, where the total transmission power of the second carrier is set to be a second transmission power value as a function of the first power allocation pattern, the second transmission power value being different from the first transmission power value.

Moreover, the subject matter as claimed in accordance with an illustrative aspect can include a machine-readable medium having stored thereon instructions which, when executed by a machine, cause the machine to perform operations including: evaluating signal to noise ratios of transceived signals emanating from a portable device; identifying an appropriate sector in an appropriate carrier with the total transmission power set to be a power level, determined by the power allocation scheme, based at least on the signal to noise ratios; and allocating signals emanating from the portable device to a power level such that the total transmit power within the sector in the associated carrier is less than or equal to the associated power level in the power allocation pattern.

Furthermore, the claimed subject matter in accordance with a further aspect can include an apparatus operable in a wireless communication system, the apparatus comprising: a processor, configured to: determine a first power allocation pattern on a plurality of different carriers; transmit signals in a first carrier of the plurality of carriers, the total transmission power of the first carrier set to a first transmission power value based on the first power allocation pattern; and broadcasting signals in a second carrier of the plurality of carriers, the total transmission power of the second carrier set to a second transmission power value based at least on the first power allocation pattern, the second transmission power value distinct from the first transmission power value; and a memory coupled to the processor for storing data.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
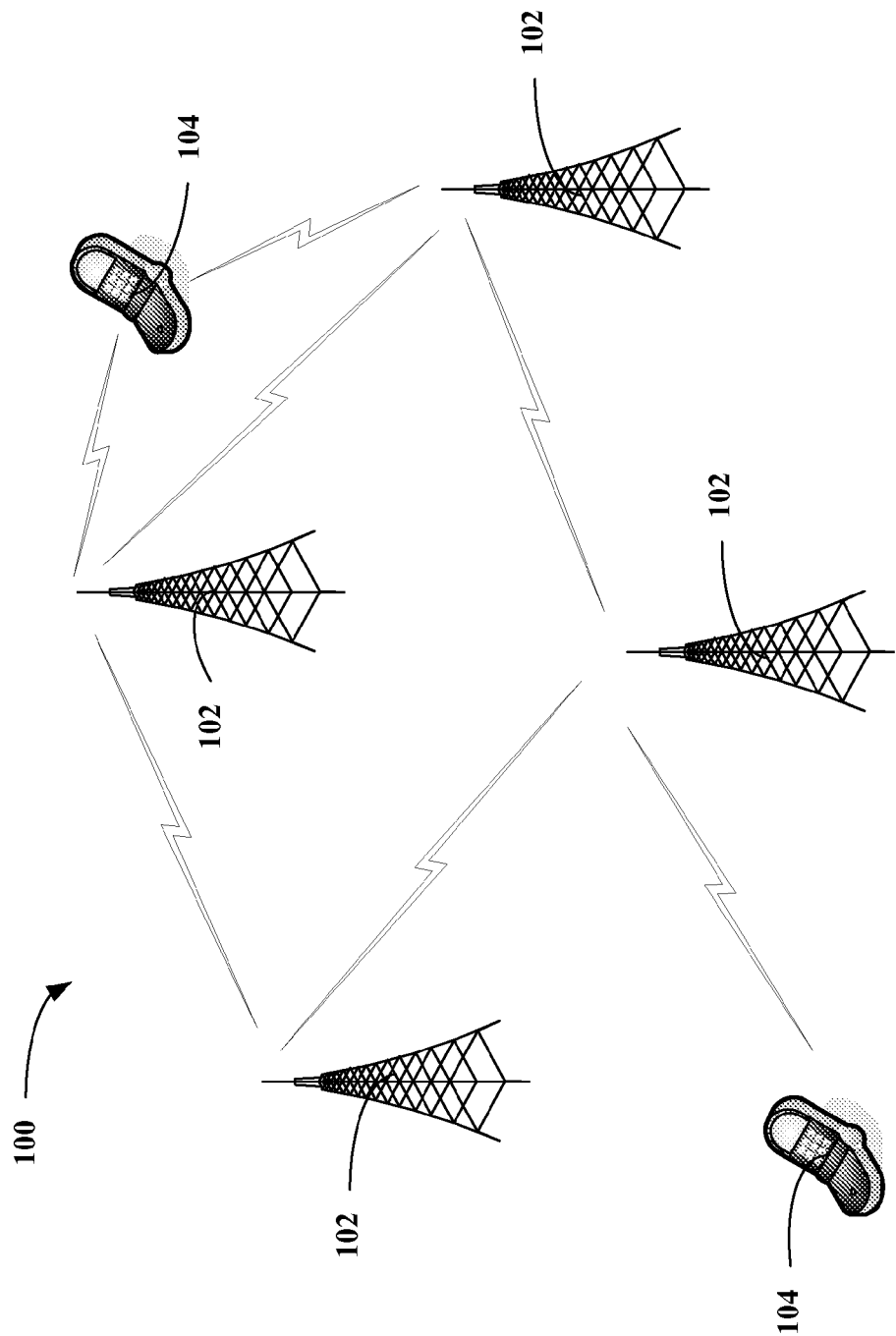
FIG. 1 is an illustration of an example wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device may refer to a device providing voice and/or data connectivity to a user. A mobile device may be connected to a computing device such as a laptop computer or desktop computer, or it may be a self contained device such as a personal digital assistant (PDA). A mobile device can also be called a system, a wireless terminal, a subscriber unit, a subscriber station, mobile station, mobile, remote station, access point, remote terminal, access terminal, user terminal, user agent, user device, or user equipment. A mobile device may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem.

A base station (e.g., access point) may refer to a device in an access network that communicates over the air-interface, through one or more sectors, with mobile devices. The base station may act as a router between the mobile device and the rest of the access network, which may include an IP network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

While the various features and attributes described herein have been explicated solely for purposes of ease of explanation in terms of a three carrier scenario, those cognizant in the art will appreciate that other carrier schemes, designs and/or approaches can be utilized without departing from the spirit, intent and ambit of the claimed subject matter. Accordingly, any and all such alternative carrier schemes, designs, approaches, and modifications, derivatives, combinations and/or permutations thereof, are specifically intended to fall within the scope of the subject matter as claimed.

Referring now to FIG. 1, a wireless communication system 100 is illustrated in accordance with various embodiments presented herein. System 100 can comprise a base station 102 (e.g., access-points) with one or more sectors that can receive, transmit, repeat, etc., wireless communication signals to each other and to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by those skilled in the art. Base station 102 may be a fixed station and/or mobile device. Mobile device 104 can be, for example, a cellular phone, a smart phone, a laptop, a handheld communication device, a handheld computing device, a satellite radio, a global positioning system, a PDA, and/or any other suitable device for communicating over wireless communication system 100.

System 100 may support various types of networks for communicating between base stations 102 and mobile devices 104. For example, a wide area network (WAN) (e.g., a cellular network) may leverage system 100. Further to this example, mobile devices 104 may transfer data to and/or obtain data from base station 102 (and/or any disparate base stations) by utilizing the wide area infrastructure network. Pursuant to another example, a local area peer to peer (P2P) network may be supported by system 100; as such, mobile devices 104 (e.g., peers) may communicate with each other via the peer to peer architecture without going through the base station 102.

Differing types of networks supported by system 100 may utilize disparate parameters such as tone spacing, symbol time, and cyclic prefix in connection with transferring data. Further, for example, parameters employed in connection with a first type of network (e.g., peer-to-peer network, wide area network, . . . ) may be a function of parameters utilized for a second type of network (e.g., wide area network, peer-to-peer network, . . . ). The air interface technique employed in the wide area network may be designed to operate in such an environment. For example, the air interface may be Orthogonal Frequency Division Multiplexing (OFDM) based. Accordingly, system parameters such as tone spacing, symbol time, and cyclic prefix may be chosen such that the air interface is robust for high mobility and long delay spread.

Figure 2:
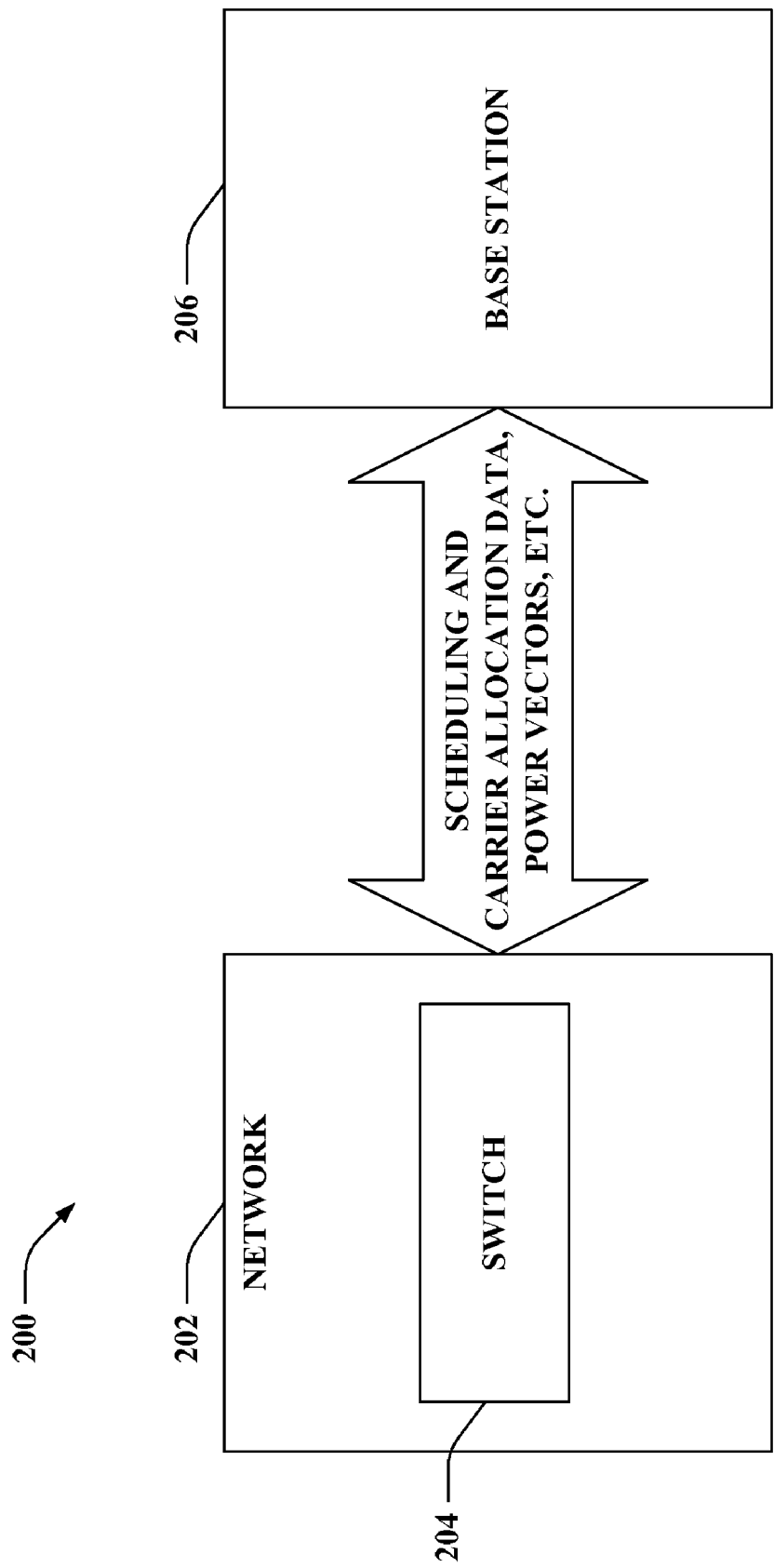
FIG. 2 is an illustration of an example system that effectuates and facilitates frequency reuse schemes.

FIG. 2 depicts a system 200 that effectuates and facilitates power allocation schemes where power allocation patterns can be established and reused among at least two carriers for at least two sectors of a cell. System 200 can include network 202 that can include mobile switching centers that coordinate the activities of all the base stations and connects the entire cellular system to a public switched telephone network (PSTN). Network 202 can be effectuated on any type a machine that includes a processor, for example. Illustrative machines that can be included within, constitute and/or comprise network 202 can include server class computing devices, handheld devices, desktop computers, notebook computers, laptop computers, consumer devices/appliances, industrial automation devices, automotive components, aviation components, and the like. Moreover network 202 can utilize any viable communication technology to effectuate intercommunication between the disparate devices that can be included therein. For example, network 202 can employ wired and/or wireless modalities and/or technologies. Moreover, network 202 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed—and/or any combination, permutation, and/or aggregation thereof.

As illustrated network 202 can be in continuous and operative, or sporadic but intermittent communication with base station 206 and can further include switch 204 that can create one or more power allocation patterns that can be employed by base station 206. Power allocation patterns can be based at least in part on information received from one or more adjacent cells (e.g., disparate base stations). Switch 204, in addition to creating one or more power allocation patterns, can cause base station 206 to selectively utilize power allocation patterns that are complementary (e.g., does not conflict with) to those power allocation patterns being employed by adjacent base stations (e.g., cells) so as to mitigate intercellular interference (e.g., interference caused by two proximately located base stations transmitting at the same or similar power levels). Additionally or alternatively, switch 204 can evaluate signal-to-noise ratios of signals received by base station 206 from one or more mobile devices (e.g., mobile devices 104), identify an appropriate carrier to assign or allocate to the mobile device associated with the received signal, and thereafter dynamically and automatically allocate or associate those signals emanating from a particular mobile device to an appropriate power level associated to the carrier in the chosen power allocation pattern.

Moreover, as illustrated network 202, in association or conjunction with switch 204, can generate scheduling and carrier allocation data and/or power allocation vectors, and the like, necessary to configure base station 206 to operate under a particular power allocation pattern.

Typically, for a single transmitter with multiple carriers, the best strategy to allocate power across carriers is to spread power evenly if it is assumed that channels are stationary—an axiom due to the concavity of the Shannon capacity. However, when an interferer is introduced (e.g., two transmitters transmitting simultaneously and thus interfering with each other) the foregoing no longer holds true. For instance, in a two transmitter and two carrier scenario where it is assumed for simplicity that power allocation in the two transmitters are symmetric (e.g., if (power level ($P_1$), power level ($P_2$)) are assigned to the two carriers (represented as $f_1$ and $f_2$ respectively) in transmitter 1 and (power level ($P_2$), power level ($P_1$)) are assigned to carriers in transmitter 2). The foregoing power allocation scheme enforces $$P_1 = P_2 = \frac{P}{2},$$

assuming P is total available power at each transmitter. Under this scheme users in peripheral regions (e.g., at the boundary of the two cells) will operate below 0 dB. In contrast, if all power is allocated to one carrier, boundary users can have signal-to-noise ratios (SNR) of $$\frac{hP}{N_0},$$

where h is the path loss and $N_0$ is noise power, which can be significantly larger than 0 dB. Thus, despite sacrificing half of the degree of freedom by shutting off one carrier, the power gain achieved is large enough to compensate for the loss and accordingly improves the capacity of boundary users.

Of course, it does not make too much sense to consider only the boundary users in a cellular network. A meaningful metric would compare between different power allocation schemes verses spectral efficiency, which is the sum data rate per second per Hertz (Hz) of the sector (transmitter) given that a mixture of users are dispersed evenly across the sector and a certain fairness criterion (e.g., usually defined on the data rate of each user) is achieved among the users. In such a case, the system can have two types of users, segment limited users and power limited users. For segment limited users, even power allocation is more favorable since it offers more segments (or degrees of freedom) while for power limited users, schemes like simple frequency reuse (e.g., shutting off some of the carriers in each sector) are more favorable since it offers signal-to-noise improvements which can compensate for the segment loss. When a mixture of users exists (e.g., boundary users, segment limited users, power limited users, . . . ), generally speaking, any power allocation vector (e.g., $P_1$, $P_2$) might be optimal, in terms of maximizing spectral efficiency, dependent on the mixture of users utilizing the system at any given time.

In a multi-sector multi-carrier system, one particular way to implement such a power allocation method is to employ different powers on different carriers within the same sector and use complementary power allocation patterns in sectors within the same cell. For instance, in a three carrier example three carriers can be reused in three sectors inside a cell (e.g., base station 206) wherein each sector utilizes carriers that can be denoted $f_1$, $f_2$, and $f_3$ each carrier operates at one of three power levels. Thus, for example, carrier $f_1$ can employ full power, carrier $f_2$ can employ moderate to medium power (e.g., a portion of total available power), and carrier $f_3$ a small portion of the total power. Moreover, in different sectors within the same cell (e.g., base station 206), the power allocation vectors for different carriers can be permutated in a way such that any single carrier uses different powers in different sectors. Such a pattern and thereof to be propagated in all cells (e.g., all base stations that comprise a cellular network) thereby improving system coverage.

The subject matter as claimed reuses generated power allocation patterns among carriers for sectors in the same cell (e.g., under the control of a single base station 206) and uses different power allocation patterns between cells (e.g., under the control disparate base stations). Reuse of power allocation patterns among carriers for sectors in the same cell and employment of different allocation patterns between cells can be appealing to operators, such as Global System for Mobile (GSM) operators, who may have deployed traditional frequency reuse (e.g., K=3) systems and would like to exploit the benefits of the Flexband idea by adding additional carriers in sectors with reduced power to increase sector capacity.

Figure 3:
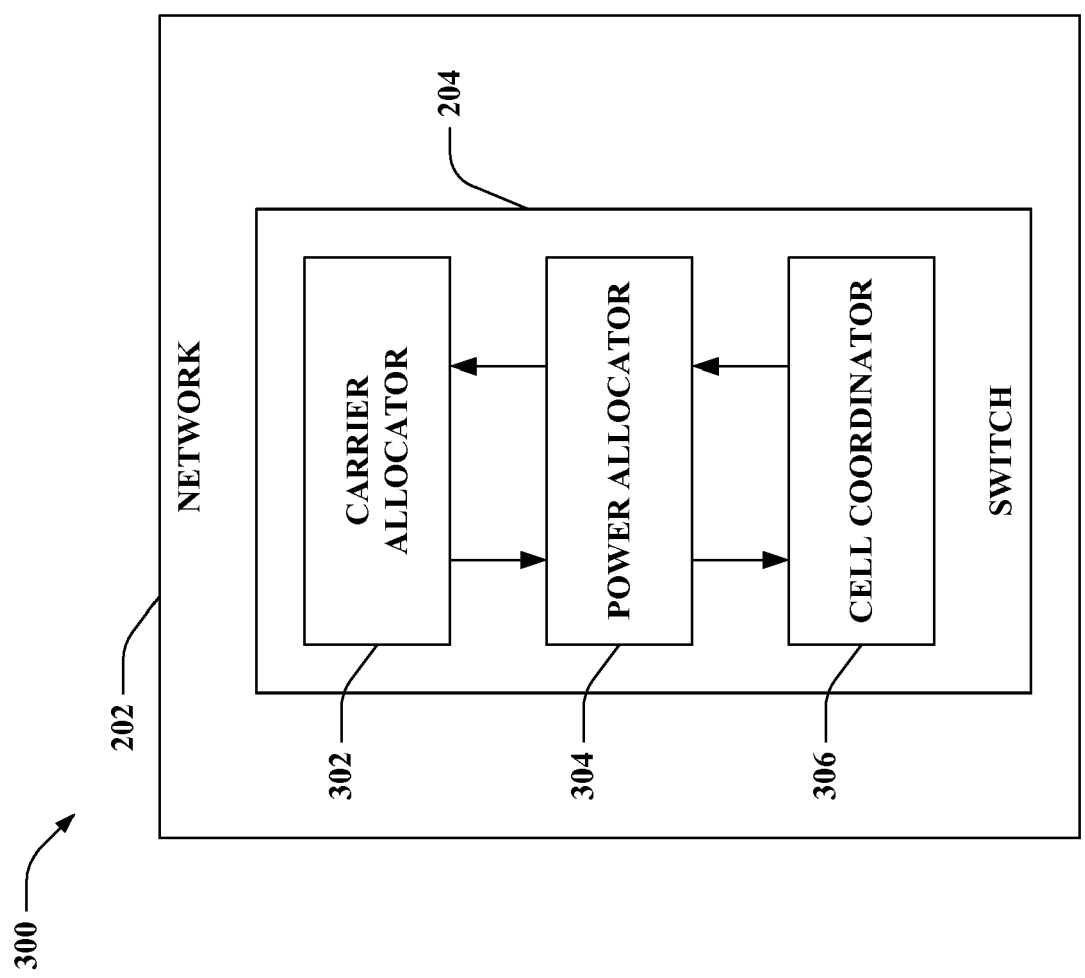
FIG. 3 is a more detailed illustration of an example system that effectuates a frequency reuse scheme.

FIG. 3 provides a more detailed depiction 300 of network 202 and more particularly switch 204 that facilitates and effectuates a power allocation scheme whereby power allocation patterns can be established and reemployed among carriers and sectors of particular cells (e.g., base stations). As illustrated switch 204 includes carrier allocator 302, power allocator 304, and/or cell coordinator 306. Carrier allocator 302, power allocator 304, or cell coordinator 306 can determine the power allocation for each carrier within each sector of each cell, in a static or dynamic manner. More specifically, the power allocation can be static (pre-defined) and independent of the user load within the system. On the other hand, the power allocator and cell coordinator can also choose to update the power allocation pattern based on the current load information within the cell and the neighboring cells. In this case, the power allocator, the carrier allocator, the cell coordinator individually and/or in conjunction with one another, evaluate signal-to-interference-and-noise ratios or signals received by base station 206 from mobile devices dispersed over the entire geographic coverage area established by base station 206. Once the power allocation scheme is determined, carrier allocator 302, power allocator 304, or cell coordinator 306 can ascertain an appropriate sector and carrier to allocate to the mobile device based at least in part on determined signal strength, putative, inferred, or perceive distance from base station 206 (e.g., transmitting tower), and other pertinent factors. Further, carrier allocator 302, power allocator 304, or cell coordinator 306, once having ascertained or determined an appropriate carrier and sector to allocate to mobile device, can dynamically and automatically associate and allocate signals originating from or being transmitted to the identified mobile device based the power allocation associated with the carrier and the sector assigned to the mobile. It should be noted that this juncture that carrier allocator 302, power allocator 304, or cell coordinator 306, either alone or in combination, can automatically and dynamically reallocate signals to more appropriate or alternative carriers and/or sectors when a diminution or augmentation in signal strength is observed or detected. Consequently, and as a corollary, it should be further observed that carrier allocator 302, power allocator 304, or cell coordinator 306, either singularly or in concert with one another, and continuously monitor power levels, carriers, and incoming and outgoing signals to mobile devices dispersed throughout the coverage area to ensure that all mobile devices within the service area, irrespective of location, achieve and maintain effective communications.

Carrier allocator 302 can receive or detect signals received from a multitude of mobile devices via base station 206. Carrier allocator 302 on receipt or detection of such signals can evaluate and gauge the signal to interference and noise ratio of the received signal. Additionally, carrier allocator 302 can utilize other factors in order to aid its assessment of the appropriate carrier to which to allocate a transmitting mobile device. Other factors that can be monitored, identified, and/or ascertained by carrier allocator 302 can include triangulating with other base stations that can comprise network 202, or diverse global positioning satellite systems, to provide a relative distance from base station 206. Carrier allocator 302 can thereafter employ such diverse inputs (directly acquired, inferred, and/or subsequently or contemporaneously determined) to dynamically and/or automatically assign, associate, and/or allocate signals emanating from particular mobile devices to appropriate carriers. Additionally and/or alternatively, carrier allocator 302 can employ one or more off artificial intelligence, machine learning, heuristics, etc., in order to assess an appropriate carriers which to allocate a transmitting mobile device.

Power allocator 304, like carrier allocator 302, can retrieve, probe, detect, and/or receives signals emanating from one or more widely dispersed mobile devices via base station 206. Power allocator 304 can, based at least in part on social trees, probe, detected, and/or receives signals, information supplied by carrier allocator 302 and cell coordinator 306, and/or data gleaned from one or more other disparate sources can allocate, automatically and/or dynamically, appropriate power to sectors of a cell to and ensure that the overall cell power utilization comports with power allocation vectors determined, established, and/or supplied. Power allocator 304 can further ensure that intra-sector power levels within the cell are appropriately and continuously maintained within acceptable operating norms. Moreover, power allocator 304 can dynamically adjust power levels whenever it determines that power levels have deviated from pre-established power allocation vectors. Additionally, power allocator 304 may ensure that all sectors within the cell control by base station 206 comports with a predetermined or contemporaneously established power allocation pattern.

Cell coordinator 306 in concert with carrier allocator 302, and/or power allocator 304 can instigate or cause power allocator 304 to dynamically adjust power supplied to sectors of the transmitting cell. More particularly, cell coordinator 306 through power allocator 304 and carrier allocator 302, can ensure that a portion of the carriers utilize full power, a portion of the carriers employ a minimal amount of the total power, and a further portion of carriers use one or more power levels that can exist between the two extremes (e.g., between full power and minimal power). Additionally, cell coordinators 306, in conjunction with carrier allocator 302 can, based at least in part on received, inferred, or subsequently or contemporaneously ascertained signal strengths, or signal to noise rations, can automatically and/or dynamically schedule those signals received from pertinent mobile devices to various channels. For instance, cell coordinator 306 can instigate or cause carrier allocator 302 to assign mobile devices currently experiencing curtailed transmission (e.g., bad signal to noise ratios—power limited mobile devices) to carriers currently utilizing full power. Similarly, cell coordinator 306, possibly in combination with carrier allocator 302 or power allocator 304, can dynamically schedule mobile devices with moderate to good signal to noise ratios (e.g., segment limited users) to carriers that are currently employing moderate to minimal power levels.

Moreover, cell coordinator 306, either individually or in association with carrier allocator 302, power allocator 304, contiguously or proximately situated, but diverse, base stations, and data supplied or retrieved there from, can automatically and dynamically generate power allocation patterns and produce power allocation vectors that can be disseminated and contemporaneously employed by diverse and distributed base stations to coordinate and synchronize carrier transmission and power allocation, thereby ensuring that inter cellular interference that can occur between geographically dispersed base stations is significantly attenuated. Additionally and/or alternatively, power allocation patterns and power allocation vectors, once generated, or during generation, can be persisted to storage media for subsequent use.

Figure 4:
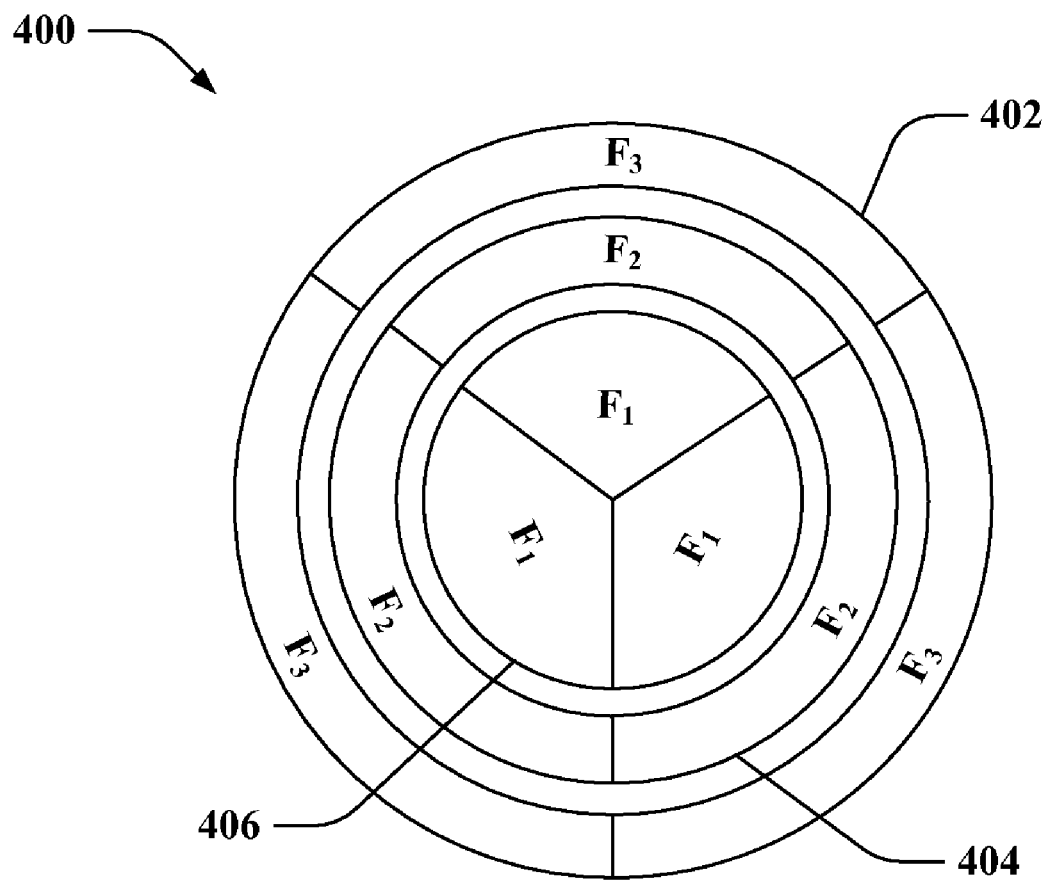
FIG. 4 is a depiction of an illustrative base station carrier power level distribution pattern in accordance with an aspect of the claimed subject matter.

FIG. 4 depicts an illustrative base station carrier power level distribution pattern 400 in accordance with an aspect of the claimed subject matter. As exemplified in FIG. 4 the base station power level/allocation distribution pattern 400 can comprise three distinct power levels represented as a radial distance from a locus or central point (e.g., the greater the distance from the center, the more power employed to transmit the carrier) for different carriers in different sectors (e.g., $F_1$ (406), $F_2$ (404), and $F_3$ (402)), for instance. In this example, illustrated carrier $F_1$ (406) inhabits and inner "ring" and indicates that a minimal power level has been assigned to this particular carrier. Carrier $F_2$ (404), as depicted, occupies a more radially distant level commensurate with the allocation of slightly more power than has been assigned or allocated carrier $F_1$ (406). Carrier $F_3$ (402), in contrast, has been assigned maximum power, and accordingly, carrier $F_3$ (402) is depicted as occupying the most radially distant "ring" under this configuration. It will be noted, that all sectors of the base station can assign/allocate the same or similar power levels to each of the respective carriers. In this manner, inter-sector interference can be curtailed or at the very least significantly mitigated, system coverage and spectral efficiency improved by scheduling mobile devices determined to have unsatisfactory signal-to-noise ratios (e.g., power limited mobile devices) to carriers employing maximal power levels (e.g., $F_3$ (402)) and mobile devices ascertained to be experiencing moderate to good signal to noise ratios (e.g., segment limited devices) to those carriers utilizing moderate to minimal power levels respectively (e.g., $F_2$ (404) and $F_1$ (406)).

Figure 5:
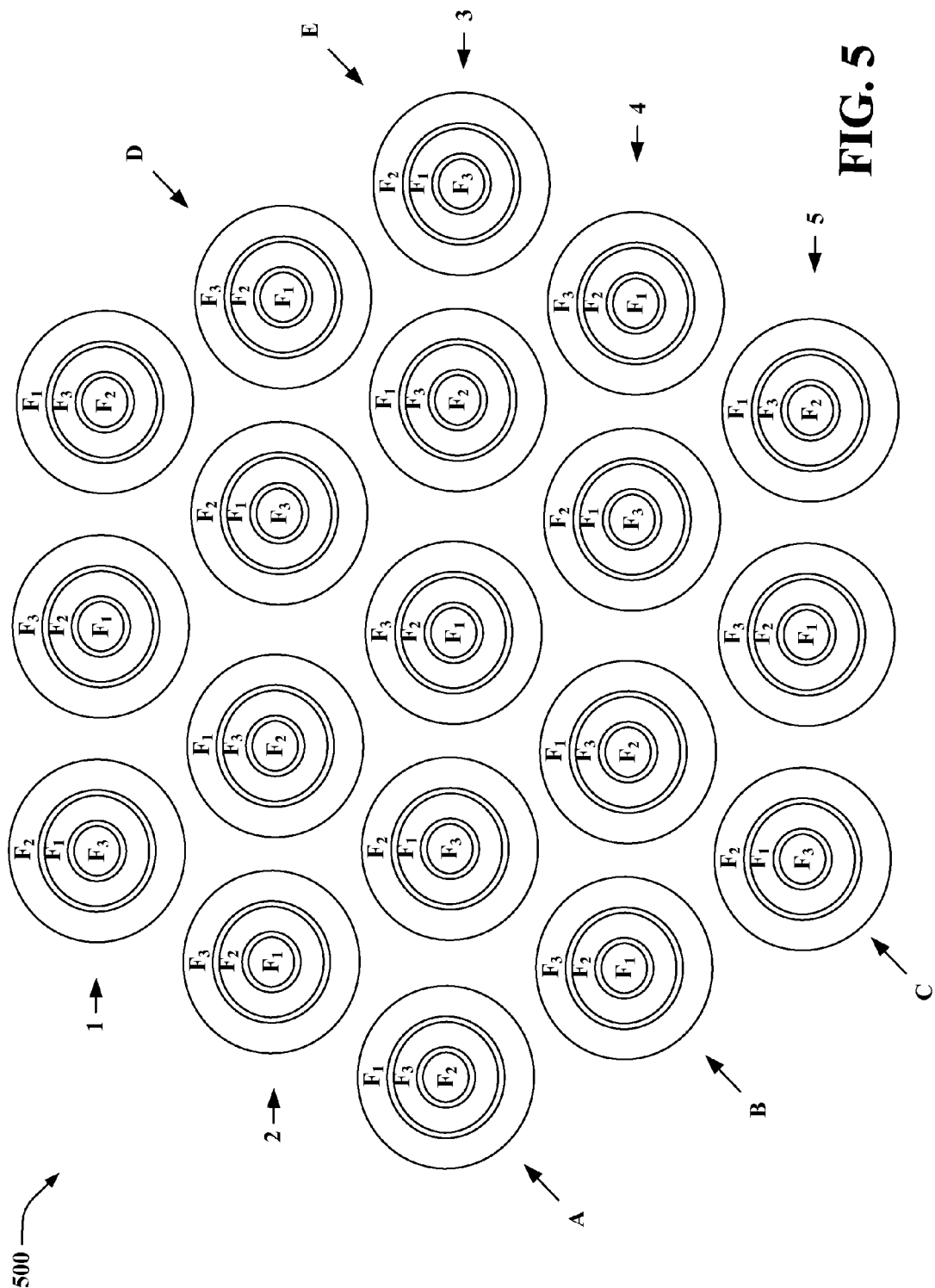
FIG. 5 is an illustration of a multi-base station deployment in accordance with an aspect of the claimed subject matter.

FIG. 5 provides illustration of a multi-base station deployment 500 in accordance with an aspect of the claimed subject matter. As depicted, the multi-base station deployment 500 can comprise multiple base stations dispersed over a geographical area to form a communication network. The communication network can conceptually be represented as a polygonal formation (e.g., a formation representative of an n-sided plane figure, where n is an integer greater than 0). As illustrated, multi-base station deployment 500 describes a 6-sided polygon (e.g., hexagon) comprising five rows and five, albeit diagonal, columns, labeled 1-5 and A-E, respectively. For instance and as depicted, for base stations stationed at (row 1, column C), (row 2, column B), (row 3, column A), (row 3, column D), (row 4, column C), and (row 5, column E), carrier $F_1$ has been allocated maximum power, carrier $F_2$ minimal power, and carrier $F_3$ moderate power. Similarly, base stations positioned at (row 1, column A), (row 2, column C), (row 3, column B), (row 3, column E), (row 4, column D), and (row 5, column C), carrier F2 can be transmitting at full power, F3 transmitting at minimum power, and carrier F1 transmitting at a power level between these two extremes. Likewise with base stations situated at (row 1, column B), (row 2, column A), (row 2, column D), (row 3, column C), (row 4, column B), (row 4, column E), and (row 5, column D), carrier $F_3$ can be allotted maximum power for transmission, carrier $F_2$ a moderate amount of power, and carrier $F_1$ the least amount of power to afford transmission.

A multi base station deployment, as illustrated in FIG. 5, that utilizes the foregoing illustrative power allocation plan and/or pattern, or any permutation, combination and/or modification thereof can significantly moderate or mitigate interference caused by proximately situated base stations broadcasting carriers at the same or similar power levels. As will be observed from inspection of FIG. 5, no two contiguously proximate base stations necessarily employ an identical or similar carrier and power level configuration. For instance, the base station at (row 3, column C) is depicted as transmitting carrier $F_3$ at full power, carrier $F_2$ at an intermediate power level, and $F_1$ at the least power, whereas base stations positioned at (row 2, column B), (row 3, column D), and (row 4, column C) can broadcast carrier $F_3$ at a power level interposed between the full power employed by carrier $F_1$ and the minimal power utilized by carrier $F_2$, and base stations installed at (row 2, column C), (row 3, column B), and (row 4, column D) can transmit carrier $F_2$ at maximum power, carrier $F_3$ at minimum power, and carrier $F_1$ at a power level that can range between the maximum power employed by carrier $F_2$ and the minimum power level utilized by carrier F3. As will be appreciated by those cognizant in the art, the foregoing power and carrier allocation and distribution patterns are presented solely for the purposes of elucidation; as such the claimed subject matter is not so limited, as alternative and/or additional carrier and power allocation and distribution patterns can be utilized without departing from the spirit, intent, and/or ambit of the claimed subject matter.

Figure 6:
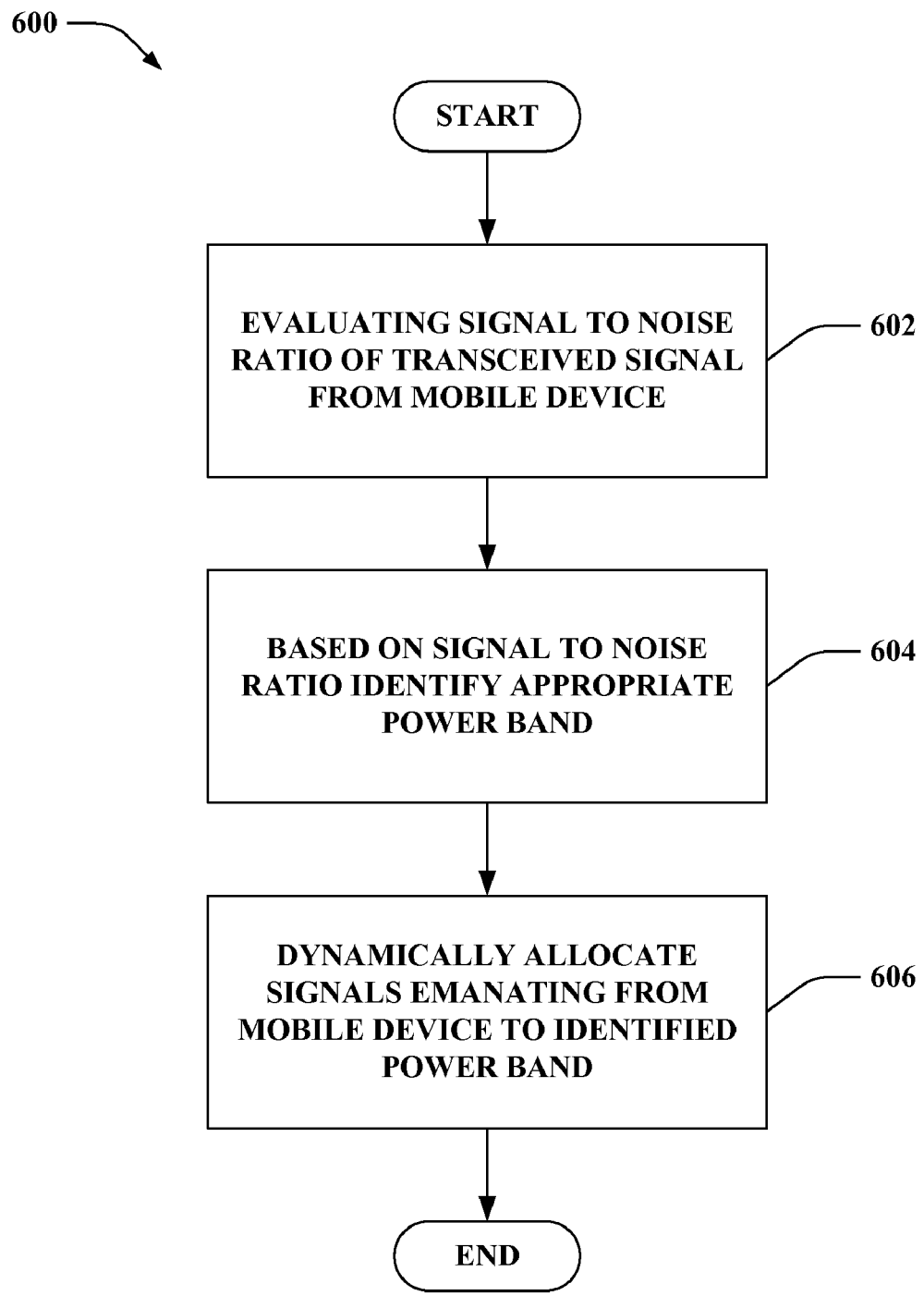
FIG. 6 is an illustration of an example methodology that facilitates and effectuates dynamic allocation of signals emanating from mobile devices to a carrier utilizing an appropriate power band.
Figure 7:
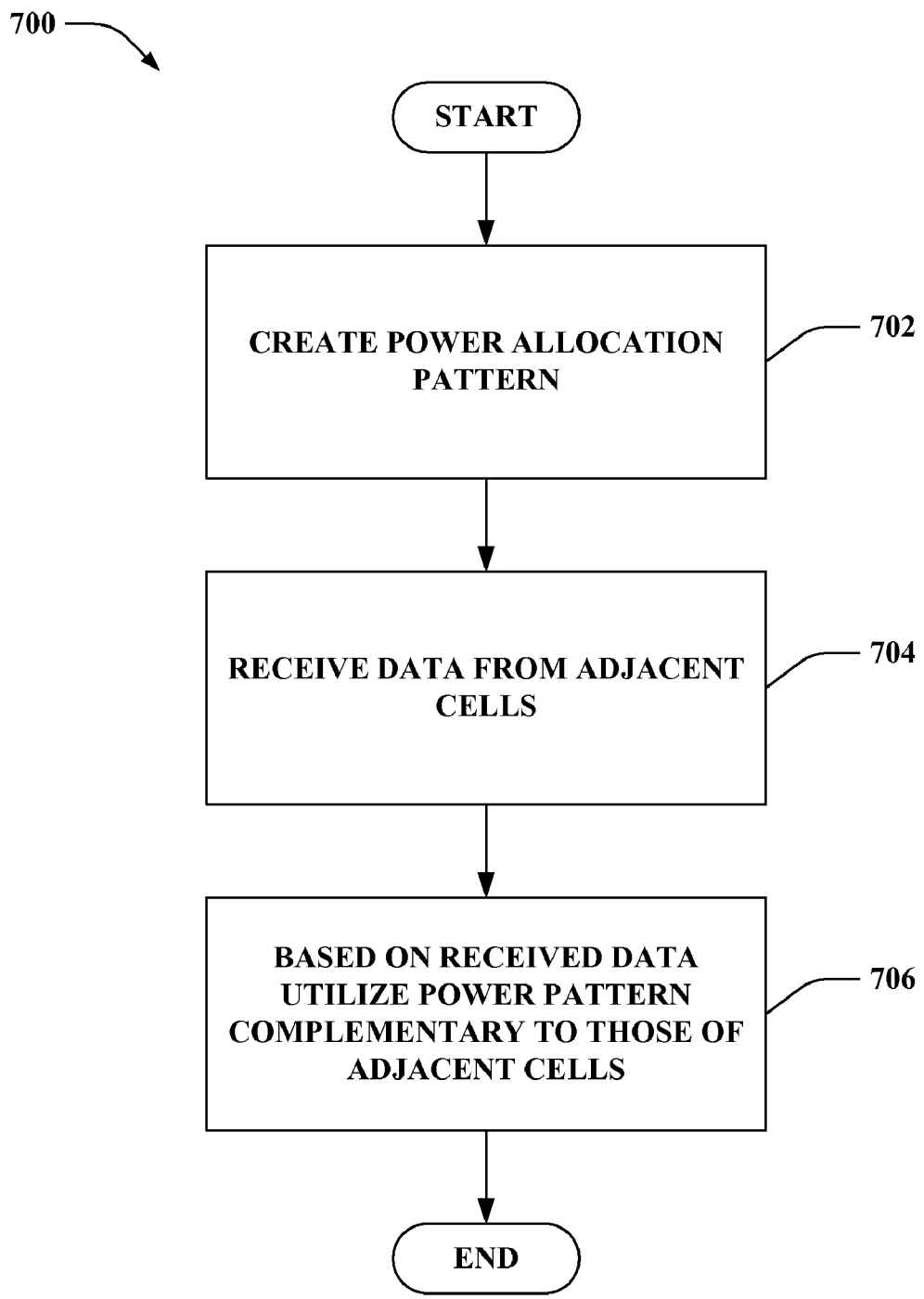
FIG. 7 is an illustration of an example methodology that can be employed by a base station to curtail undesirable intercellular interference between geographically proximate base stations transmitting carrier at the same power levels.
Figure 8:
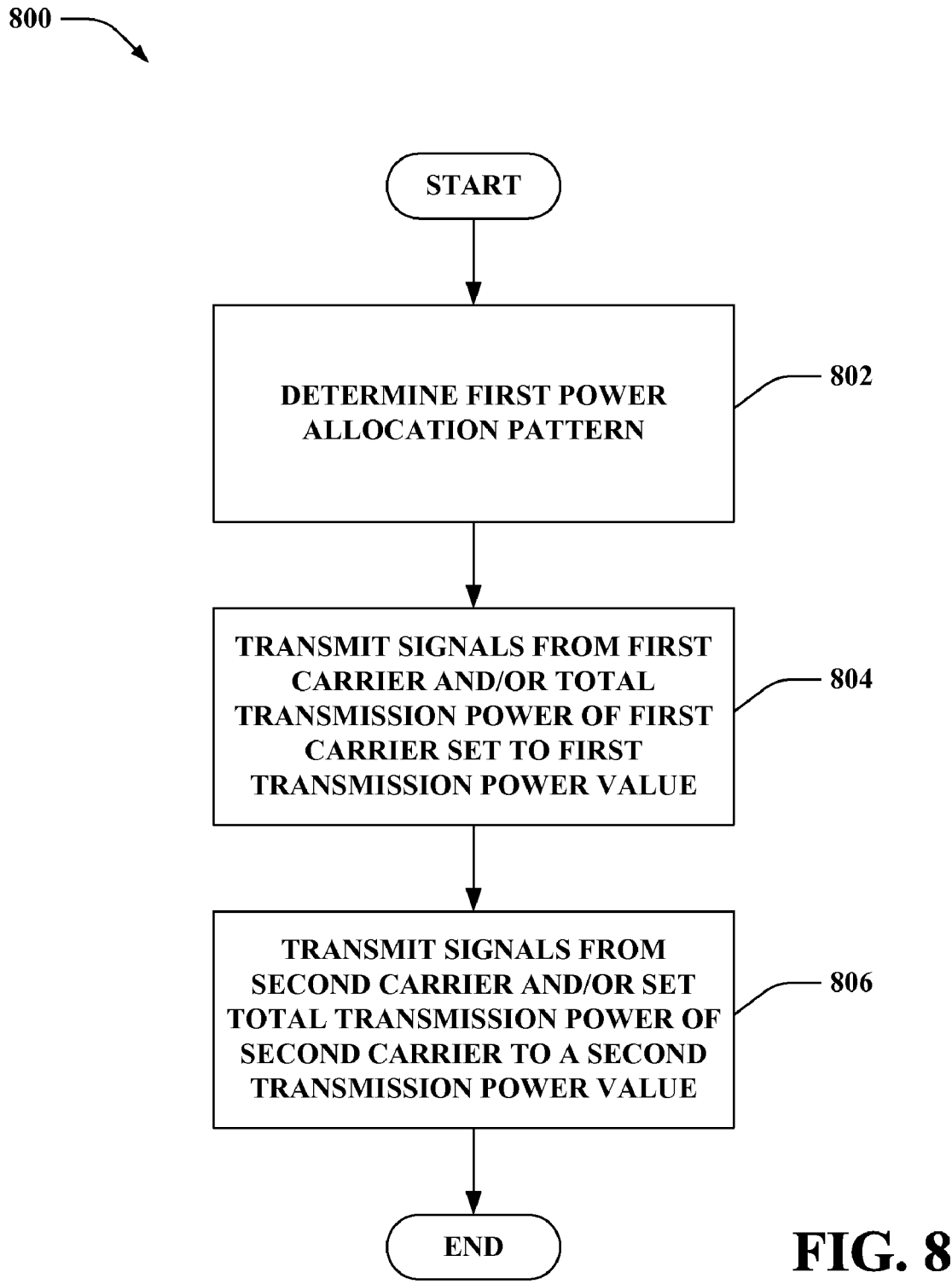
FIG. 8 is an illustration of an example methodology that can be utilized to allocate a set of different power allocation patterns for different carriers in the same sectors and to use the same power allocation pattern for different sectors within the same cell.

Referring to FIGS. 6-8, methodologies relating to the generation of power allocation schemes and the reuse of power allocation patterns amongst different carriers for sectors in the same cell and different power allocation patterns between cells are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 6 illustrates a methodology 600 that facilitates the dynamic allocation of signals emanating from mobile devices to a carrier utilizing an appropriate power level, determined by the power allocation scheme. At 602 the method can evaluate signal to interference and noise ratios of signals received from one or more diverse mobile devices dispersed throughout a base stations geographical broadcasting area. At 604, based at least in part on the determined signal to noise ratios, the methodology identifies an appropriate carrier and sector to which to assign the particular mobile device. For instance, if it is determined that the signal to interference and noise ratio is bad, the methodology can identify carriers transmitting within the maximum power level band as being the most appropriate carriers to which to assign the mobile device at issue. Alternatively, if it is determined that the signal to interference and noise ratio of the transmitted signal is moderate to good, the methodology can identify carriers transmitting at low to medium power levels as being appropriate. Load balancing between different carriers can also be taken into considerations in making such decisions. At 606, the methodology, based at least in part on the evaluated signal to interference and noise ratio and the identified or determined carrier to which signals from mobile device, can dynamically allocate or assign signals transmitted to or from the mobile device to the identified carrier employing the identified power level.

Turning now to FIG. 7, depicted therein is an illustrative methodology 700 that can be employed by base stations to curtail or at the very least moderate or mitigate undesirable intercellular interference between geographically proximate base stations transmitting carriers at the same or similar power levels. At 702 a power allocation pattern or scheme for an entire cluster of base stations can be created. For instance, a power allocation scheme or pattern can be contemporaneously created in response to exigent circumstances (e.g., failure, removal, or addition of base stations within the broadcast range of extant base stations). The power allocation pattern or scheme can initially be an exemplar or template pattern or scheme that can subsequently be subject to dynamic but iterative modification based at least on the acquisition of further exogenous and subsequently gathered information, for example. At 704 the methodology can receive or solicit data from proximately adjacent cells or geographically contiguous base stations, and other external sources of data, such as, for instance, mobile switching centers. At 706 based at least in part on the supplied or retrieved data, the created power allocation pattern, and other pertinent factors a power allocation pattern complementary to power allocation patterns utilized by adjacent or proximate cells or base stations can be selected in order to curtail or at the very least moderate or mitigate undesirable intercellular interference between proximate base stations transmitting carriers at the same or similar power levels.

FIG. 8 depicts an illustrative methodology that allocates a set of different power allocation patterns for different carriers in the same sectors and to use the same power allocation pattern for different sectors within the same cell in accordance with an aspect of the claimed subject matter. The method can commence at 802 where a first power allocation pattern can be ascertained on a plurality of carriers. At 804 signals in a first carrier from the plurality of carriers can be transmitted, the total transmission power of the first carrier set to a first transmission power value based at least in part on the first power allocation pattern. At 806 signals associated with a second carrier affiliated with the plurality of carriers can be transmitted such that the total transmission power of the second carrier can be set to a second transmission power value, the second transmission power value can be based at least in part on the first power allocation pattern where the first and second transmission power value can be disparate from one another.

It will be appreciated that, in accordance with one or more aspects described herein, inferences can be made regarding selecting users and/or rates in connection with scheduling uplink transmission. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding analyzing an interference cost associated with uplink transmission; the inferred interference cost may be signaled to a base station to enable uplink scheduling. By way of further illustration, an inference may be made related to a priority of data to be transmitted via an uplink traffic channel, and the inferred priority may be employed in connection with selecting users for uplink assignments. It will be appreciated that the foregoing examples are illustrative in nature and are not intended to limit the number of inferences that can be made or the manner in which such inferences are made in conjunction with the various embodiments and/or methods described herein.

Figure 9:
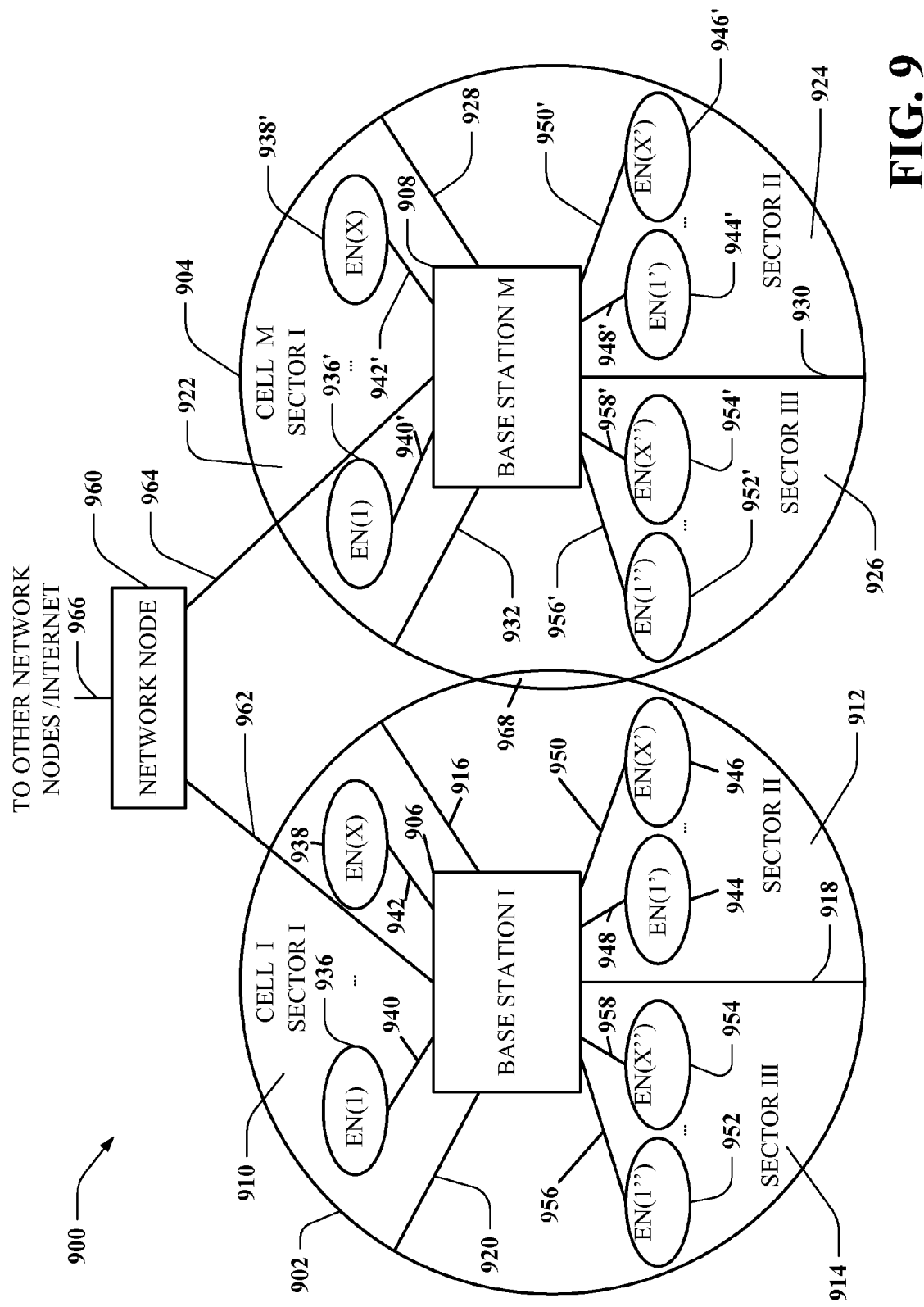
FIG. 9 is an illustration of an example communication system implemented in accordance with various aspects including multiple cells.

FIG. 9 depicts an example communication system 900 implemented in accordance with various aspects including multiple cells: cell I 902, cell M 904. Note that neighboring cells 902, 904 overlap slightly, as indicated by cell boundary region 968, thereby creating potential for signal interference between signals transmitted by base stations in neighboring cells. Each cell 902, 904 of system 900 includes three sectors. Cells which have not be subdivided into multiple sectors (N=1), cells with two sectors (N=2) and cells with more than 3 sectors (N>3) are also possible in accordance with various aspects. Cell 902 includes a first sector, sector I 910, a second sector, sector II 912, and a third sector, sector III 914. Each sector 910, 912, 914 has two sector boundary regions; each boundary region is shared between two adjacent sectors.

Sector boundary regions provide potential for signal interference between signals transmitted by base stations in neighboring sectors. Line 916 represents a sector boundary region between sector I 910 and sector II 912; line 918 represents a sector boundary region between sector II 912 and sector III 914; line 920 represents a sector boundary region between sector III 914 and sector I 910. Similarly, cell M 904 includes a first sector, sector I 922, a second sector, sector II 924, and a third sector, sector III 926. Line 928 represents a sector boundary region between sector I 922 and sector II 924; line 930 represents a sector boundary region between sector II 924 and sector III 926; line 932 represents a boundary region between sector III 926 and sector I 922. Cell I 902 includes a base station (BS), base station I 906, and a plurality of end nodes (ENs) (e.g., mobile devices) in each sector 910, 912, 914. Sector I 910 includes EN(1) 936 and EN(X) 938 coupled to BS 906 via wireless links 940, 942, respectively; sector II 912 includes EN(1') 944 and EN(X') 946 coupled to BS 906 via wireless links 948, 950, respectively; sector III 914 includes EN(1") 952 and EN(X") 954 coupled to BS 906 via wireless links 956, 958, respectively. Similarly, cell M 904 includes base station M 908, and a plurality of end nodes (ENs) in each sector 922, 924, 926. Sector I 922 includes EN(1) 936' and EN(X) 938' coupled to BS M 908 via wireless links 940', 942', respectively; sector II 924 includes EN(1') 944' and EN(X') 946' coupled to BS M 908 via wireless links 948', 950', respectively; sector 3 926 includes EN(1") 952' and EN(X") 954' coupled to BS 908 via wireless links 956', 958', respectively.

System 900 also includes a network node 960 which is coupled to BS I 906 and BS M 908 via network links 962, 964, respectively. Network node 960 is also coupled to other network nodes, e.g., other base stations, AAA server nodes, intermediate nodes, routers, etc. and the Internet via network link 966. Network links 962, 964, 966 may be, e.g., fiber optic cables. Each end node, e.g., EN(1) 936 may be a wireless terminal including a transmitter as well as a receiver. The wireless terminals, e.g., EN(1) 936 may move through system 900 and may communicate via wireless links with the base station in the cell in which the EN is currently located. The wireless terminals, (WTs), e.g., EN(1) 936, may communicate with peer nodes, e.g., other WTs in system 900 or outside system 900 via a base station, e.g., BS 906, and/or network node 960. WTs, e.g., EN(1) 936 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Figure 10:
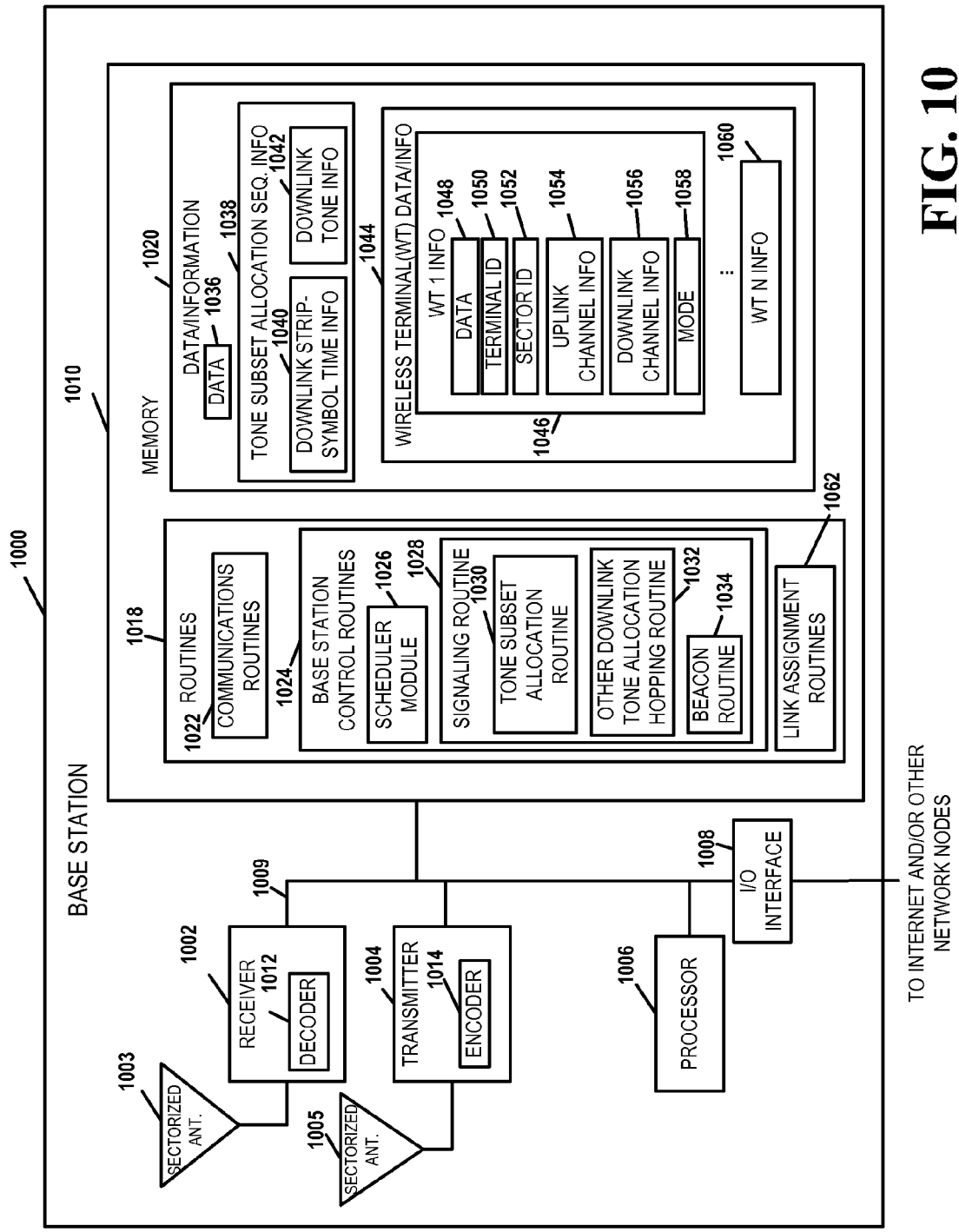
FIG. 10 is an illustration of an example base station in accordance with various aspects.

FIG. 10 illustrates an example base station 1000 in accordance with various aspects. Base station 1000 implements tone subset allocation sequences, with different tone subset allocation sequences generated for respective different sector types of the cell. The base station 1000 includes a receiver 1002, a transmitter 1004, a processor 1006, e.g., CPU, an input/output interface 1008 and memory 1010 coupled together by a bus 1009 over which various elements 1002, 1004, 1006, 1008, and 1010 may interchange data and information.

Sectorized antenna 1003 coupled to receiver 1002 is used for receiving data and other signals, e.g., channel reports, from wireless terminals transmissions from each sector within the base station's cell. Sectorized antenna 1005 coupled to transmitter 1004 is used for transmitting data and other signals, e.g., control signals, pilot signal, beacon signals, etc. to wireless terminals within each sector of the base station's cell. In various aspects, base station 1000 may employ multiple receivers 1002 and multiple transmitters 1004, e.g., an individual receiver 1002 for each sector and an individual transmitter 1004 for each sector. Processor 1006, may be, e.g., a general purpose central processing unit (CPU). Processor 1006 controls operation of base station 1000 under direction of one or more routines 1018 stored in memory 1010 and implements the methods. I/O interface 1008 provides a connection to other network nodes, coupling the BS 1000 to other base stations, access routers, AAA server nodes, etc., other networks, and the Internet. Memory 1010 includes routines 1018 and data/information 1020.

Data/information 1020 includes data 1036, tone subset allocation sequence information 1038 including downlink strip-symbol time information 1040 and downlink tone information 1042, and wireless terminal (WT) data/info 1044 including a plurality of sets of WT information: WT 1 info 1046 and WT N info 1060. Each set of WT info, e.g., WT 1 info 1046 includes data 1048, terminal ID 1050, sector ID 1052, uplink channel information 1054, downlink channel information 1056, and mode information 1058.

Routines 1018 include communications routines 1022 and base station control routines 1024. Base station control routines 1024 includes a scheduler module 1026 and signaling routines 1028 including a tone subset allocation routine 1030 for strip-symbol periods, other downlink tone allocation hopping routine 1032 for the rest of symbol periods, e.g., non strip-symbol periods, and a beacon routine 1034.

Data 1036 includes data to be transmitted that will be sent to encoder 1014 of transmitter 1004 for encoding prior to transmission to WTs, and received data from WTs that has been processed through decoder 1012 of receiver 1002 following reception. Downlink strip-symbol time information 1040 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1042 includes information including a carrier frequency assigned to the base station 1000, the number and frequency of tones, and the set of tone subsets to be allocated to the strip-symbol periods, and other cell and sector specific values such as slope, slope index and sector type.

Data 1048 may include data that WT1 has received from a peer node, data that WT1 desires to be transmitted to a peer node, and downlink channel quality report feedback information. Terminal ID 1050 is a base station 1000 assigned ID that identifies WT1. Sector ID 1052 includes information identifying the sector in which WT1 is operating. Sector ID 1052 can be used, for example, to determine the sector type. Uplink channel information 1054 includes information identifying channel segments that have been allocated by scheduler 1026 for WT1 to use, e.g., uplink traffic channel segments for data, dedicated uplink control channels for requests, power control, timing control, etc. Each uplink channel assigned to WT1 includes one or more logical tones, each logical tone following an uplink hopping sequence. Downlink channel information 1056 includes information identifying channel segments that have been allocated by scheduler 1026 to carry data and/or information to WT1, e.g., downlink traffic channel segments for user data. Each downlink channel assigned to WT1 includes one or more logical tones, each following a downlink hopping sequence. Mode information 1058 includes information identifying the state of operation of WT1, e.g. sleep, hold, on.

Communications routines 1022 control the base station 1000 to perform various communications operations and implement various communications protocols. Base station control routines 1024 are used to control the base station 1000 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1028 controls the operation of receiver 1002 with its decoder 1012 and transmitter 1004 with its encoder 1014. The signaling routine 1028 is responsible for controlling the generation of transmitted data 1036 and control information. Tone subset allocation routine 1030 constructs the tone subset to be used in a strip-symbol period using the method of the aspect and using data/information 1020 including downlink strip-symbol time info 1040 and sector ID 1052. The downlink tone subset allocation sequences will be different for each sector type in a cell and different for adjacent cells. The WTs receive the signals in the strip-symbol periods in accordance with the downlink tone subset allocation sequences; the base station 1000 uses the same downlink tone subset allocation sequences in order to generate the transmitted signals. Other downlink tone allocation hopping routine 1032 constructs downlink tone hopping sequences, using information including downlink tone information 1042, and downlink channel information 1056, for the symbol periods other than the strip-symbol periods. The downlink data tone hopping sequences are synchronized across the sectors of a cell. Beacon routine 1034 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 11:
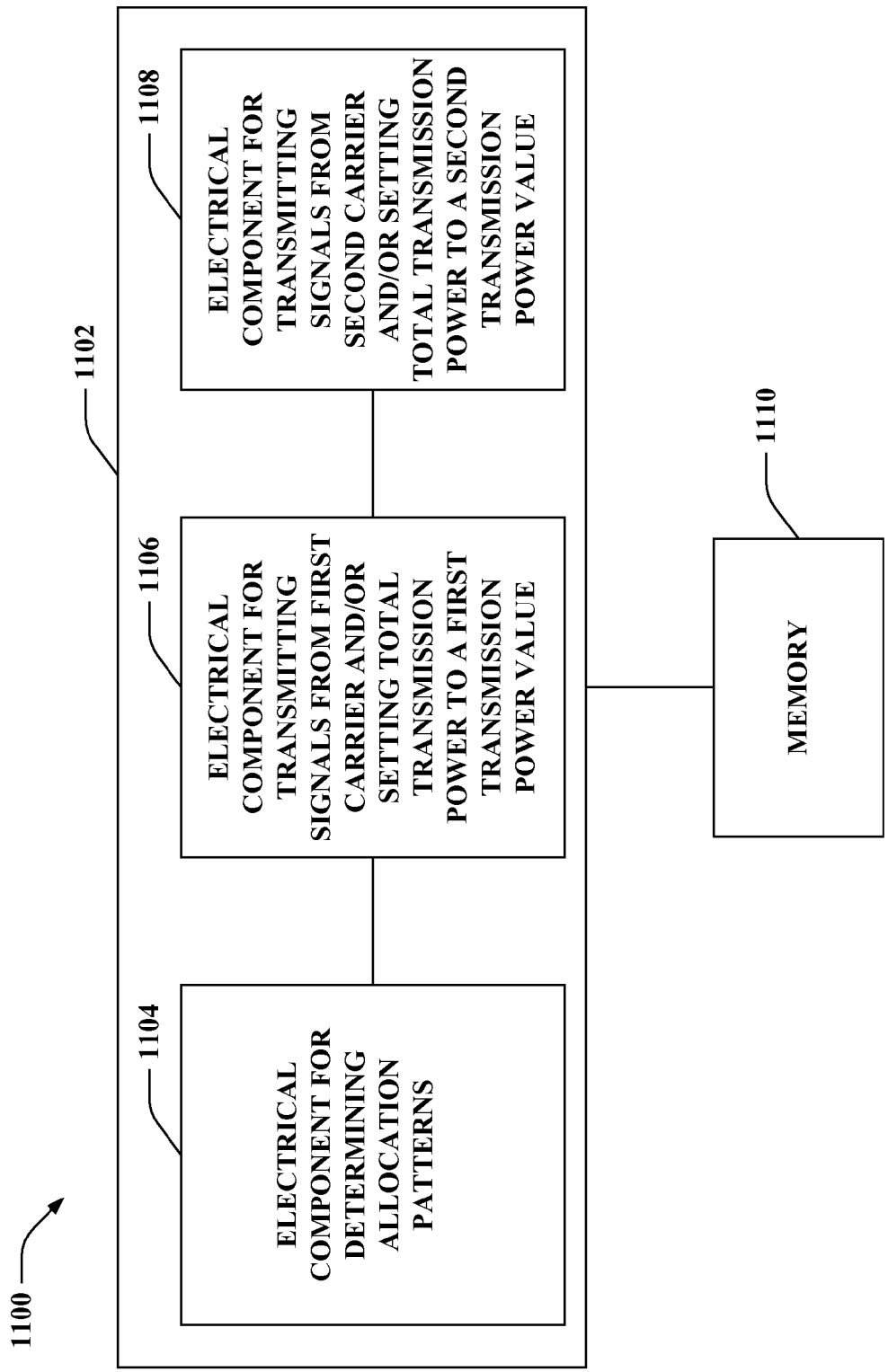
FIG. 11 is an illustration of an example system that effectuates and facilitates frequency reuse schemes.

With reference to FIG. 11, illustrated is a system 1100 that dynamically allocates signals emanating from mobile devices to a carrier utilizing an appropriate power band. For example, system 1100 may reside at least partially within a base station. It is to be appreciated that system 1100 is represented as including functional blocks, which may be functional blocks that represent functions implemented by a processor, software, or combination thereof (e.g., firmware). System 1100 includes a logical grouping 1102 of electrical components that can act in conjunction. For instance, logical grouping 1102 may include an electrical component for determining allocation patterns 1104. Further, logical grouping 1102 may comprise an electrical component for transmitting signals from first carrier and/or setting total transmission power to a first transmission power value 1106. Also, logical grouping 1102 may include an electrical component for transmitting signals from a second carrier and/or setting total transmission power to a second transmission power value 1108. Additionally, system 1100 may include a memory 1110 that retains instructions for executing functions associated with electrical components 1104, 1106 and 1108. While shown as being external to memory 1110, it is to be understood that one or more of electrical components 1104, 1106 and 1108 may exist within memory 1110.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a first wireless communications device comprising:

using a template pattern as a first power allocation pattern on a plurality of different carriers;

receiving information indicating a dynamically determined power allocation pattern which was dynamically determined based on load information within a first cell in which said wireless communications device is located and load information from neighboring cells;

changing said first power allocation pattern from said template pattern to said dynamically determined power allocation pattern;

transmitting signals in a first carrier of the plurality of carriers, where a total transmission power of the first carrier is set to be a first transmission power value as a function of the dynamically determined power allocation pattern; and transmitting signals in a second carrier of the plurality of carriers, where a total transmission power of the second carrier is set to be a second transmission power value as a function of the dynamically determined power allocation pattern, the second transmission power value being different from the first transmission power value.

2. The method of claim 1, where the first transmission power value is at least 3 dB greater than the second transmission power value.

3. A method of operating a base station device serving a plurality of sectors in a first cell, the method further comprising:
   determining a first power allocation pattern on a plurality of different carriers;
   transmitting signals in a first carrier of the plurality of carriers, wherein transmitting signals in a first carrier includes:
      i) transmitting signals to a first sector of the plurality of sectors in the first carrier, where a total transmission power of the first carrier to the first sector is set to be a first transmission power value; and
      ii) transmitting signals to a second sector of the plurality of sectors in the first carrier, where a total transmission power of the first carrier to the second sector is set to be the first transmission power value; and
   transmitting signals in a second carrier of the plurality of carriers, where a total transmission power of the second carrier is set to be a second transmission power value as a function of the first power allocation pattern, the second transmission power value being different from the first transmission power value.

4. The method of claim 3,
   wherein transmitting signals in the second carrier of the plurality of carriers includes transmitting signals to the first sector of the plurality of sectors in the second carrier, where the total transmission power of the second carrier to the first sector is set to be the second transmission power value, the method further comprising:
   transmitting signals to the second sector of the plurality of sectors in the second carrier, where the total transmission power of the second carrier to the second sector is set to be the second transmission power value.

5. The method of claim 4, where the first and the second sectors of the cell are geographically adjacent to each other.

6. The method of claim 3, further comprising
   operating a second base station device in a second cell adjacent to said first cell, where the second base station determines a second power allocation pattern on the plurality of carriers, transmits signals in the first carrier to a sector with the total transmission power of the first carrier to the sector being set to be a third transmission power value as a function of the second power allocation pattern, and transmits signals in the second carrier to the sector with the total transmission power of the second carrier to the sector being set to be a fourth transmission power value as a function of the second power allocation pattern, the fourth transmission power value being different from the third transmission power value.

7. The method of claim 6, where the third transmission power value is equal to the second transmission power value and the fourth transmission power value is equal to the first transmission power value.

8. The method of claim 3, wherein a second base station serving a plurality of sectors in a second cell, transmits signals to a first sector of the second cell in the first carrier with the total transmission power of the first carrier to the first sector of the second cell being set to be the second transmission power value, transmits signals to a second sector of the second cell in the first carrier with the total transmission power of the first carrier to the second sector of the second cell being set to be the second transmission power value, transmits signals to the first sector of the second cell in the second carrier with the total transmission power of the second carrier to the first sector of the second cell being set to be the first transmission power value, and transmits signals to the second sector of the second cell in the second carrier with the total transmission power of the second carrier to the second sector of the second cell being set to be the first transmission power value.

9. An apparatus operable in a wireless communication system, comprising:
   means for evaluating signal to noise ratios of transceived signals emanating from a portable means for transceiving;
   means for identifying an appropriate sector and an appropriate carrier with a total transmission power set to be a power level, determined by a power allocation pattern, based at least on the signal to noise ratios; and
   means for allocating signals emanating from the portable means for transceiving to a power level such that the total transmission power within the identified sector and the identified carrier is less than or equal to the associated power level in the power allocation pattern.

10. The apparatus of claim 9, wherein the means for allocating signals emanating from the portable means for transceiving is located at a distant transmitting boundary to a carrier utilizing most power.

11. The apparatus of claim 9, wherein the means for allocating signals emanating from the portable means for transceiving is positioned in close proximity to means for evaluating.

12. A base station serving a plurality of sectors in a first cell, said base station being configured to execute a method comprising:
   determining a first power allocation pattern on a plurality of different carriers;
   transmitting signals in a first carrier of the plurality of carriers, wherein transmitting signals in a first carrier includes:
      i) transmitting signals to a first sector of the plurality of sectors in the first carrier, where a total transmission power of the first carrier to the first sector is set to be a first transmission power value; and
      ii) transmitting signals to a second sector of the plurality of sectors in the first carrier, where a total transmission power of the first carrier to the second sector is set to be the first transmission power value; and
   transmitting signals in a second carrier of the plurality of carriers, where a total transmission power of the second carrier is set to be a second transmission power value as a function of the first power allocation pattern, the second transmission power value being different from the first transmission power value.

13. A non-transitory machine-readable medium having stored thereon instructions which, when executed by a machine, cause the machine to perform operations including:
   evaluating signal to noise ratios of transceived signals emanating from a portable device;
   identifying an appropriate sector in and an appropriate carrier with a total transmission power set to be a power level, determined by a power allocation pattern, based at least on the signal to noise ratios; and
   allocating signals emanating from the portable device to a power level such that the total transmission power within the identified sector and the identified carrier is less than or equal to the associated power level in the power allocation pattern.

14. The non-transitory machine-readable medium of claim 13, wherein the portable device is located at a distant transmitting boundary to a carrier utilizing most power.

15. The non-transitory machine-readable medium of claim 13, wherein the portable device positioned in close proximity to a carrier consuming least power.

16. An apparatus operable in a wireless communication system, the apparatus comprising:
a processor, configured to:
use a template pattern as a first power allocation pattern on a plurality of different carriers;
receive information indicating a dynamically determined power allocation pattern which was dynamically determined based on load information within a cell in which said wireless communications device is located and load information from neighboring cells;
change said first power allocation pattern from said template pattern to said dynamically determined power allocation pattern;
transmit signals in a first carrier of the plurality of carriers, a total transmission power of the first carrier set to a first transmission power value based on the dynamically determined power allocation pattern; and
transmit signals in a second carrier of the plurality of carriers, a total transmission power of the second carrier set to a second transmission power value based at least on the dynamically determined power allocation pattern, the second transmission power value distinct from the first transmission power value; and
a memory coupled to the processor for storing data.

17. The apparatus of claim 16, the first transmission power value is at least 3 dB greater than the second transmission power value.

18. A base station device serving a plurality of sectors in a first cell, said base station device comprising:
a processor configured to:
determine a first power allocation pattern on a plurality of different carriers;
transmit signals in a first carrier of the plurality of carriers, in transmitting signals in a first carrier said processor being configured to
(i) transmit signals to a first sector of the plurality of sectors in the first carrier, a total transmission power of the first carrier to the first sector being set to a first transmission power value, and
(ii) transmit signals to a second sector of the plurality of sectors in the first carrier, a total transmission power of the first carrier to the second sector being set to the first transmission power value;
transmit signals in a second carrier of the plurality of carriers, where a total transmission power of the second carrier is set to be a second transmission power value as a function of the first power allocation pattern, the second transmission power value being different from the first transmission power value; and
a memory coupled to the processor for storing data.

19. The base station of claim 18,
wherein in transmitting signals in the second carrier of the plurality of carriers the processor is further configured to transmit signals to the first sector of the plurality of sectors in the second carrier, the total transmission power of the second carrier to the first sector being set to the second power transmission power value; and
wherein said processor is further configured to transmit signals to the second sector of the plurality of sectors in the second carrier, the total transmission power of the second carrier to the second sector being set to the second transmission power value.

20. The base station of claim 19, wherein the first and the second sectors are geographically adjacent to each other.

21. A base station serving a plurality of sectors in a first cell, comprising:
means for using a template pattern as a first power allocation pattern on a plurality of different carriers;
means for receiving information indicating a dynamically determined power allocation pattern which was dynamically determined based on load information within a first cell in which said wireless communications device is located and load information from neighboring cells;
means for changing said first power allocation pattern from said template pattern to said dynamically determined power allocation pattern;
means for transmitting signals in a first carrier of the plurality of carriers, a total transmission power of the first carrier being set to be a first transmission power value as a function of the dynamically determined power allocation pattern; and
means for transmitting signals in a second carrier of the plurality of carriers, a total transmission power of the second carrier being set to be a second transmission power value as a function of the dynamically determined power allocation pattern, the second transmission power value being different from the first transmission power value.

* * * * *